(12) United States Patent
Jeong et al.

(10) Patent No.: US 10,951,410 B1
(45) Date of Patent: Mar. 16, 2021

(54) SYSTEM FOR IMPLEMENTING A VIRTUAL MACHINE BASED ON A ZERO-KNOWLEDGE PROOF CIRCUIT FOR GENERAL OPERATION VERIFICATION

(71) Applicants: Onther, Inc., Seoul (KR); Byeong-tae Ahn, Seoul (KR)

(72) Inventors: Soonhyeong Jeong, Gyeonggi-do (KR); Byeong-tae Ahn, Gyeonggi-do (KR)

(73) Assignees: Onther, Inc., Seoul (KR); Byeong-Tae Ahn, Seoul (KR)

( * ) Notice: Subject to any disclaimer, the term of this patent is extended or adjusted under 35 U.S.C. 154(b) by 0 days.

(21) Appl. No.: 17/092,467

(22) Filed: Nov. 9, 2020

(30) Foreign Application Priority Data

Jul. 3, 2020 (KR) .................. 10-2020-0082417

(51) Int. Cl.
| | |
|---|---|
| *H04L 9/32* | (2006.01) |
| *H04L 9/30* | (2006.01) |
| *G06F 9/455* | (2018.01) |
| *G06F 9/30* | (2018.01) |
| *H04L 29/06* | (2006.01) |

(52) U.S. Cl.
CPC ........ *H04L 9/3221* (2013.01); *G06F 9/30134* (2013.01); *G06F 9/45558* (2013.01); *H04L 9/3026* (2013.01); *G06F 2009/45562* (2013.01)

(58) Field of Classification Search
CPC ....... G06F 2009/45562; G06F 9/30134; G06F 9/45558; H04L 9/3221; H04L 9/3026; H04L 2209/38; H04L 63/12; H04L 63/18; H04L 63/20; H04L 9/0637; H04L 9/0643; H04L 9/3218; H04L 9/3236
See application file for complete search history.

(56) References Cited

U.S. PATENT DOCUMENTS

2005/0058288 A1* 3/2005 Sundaram ............... H04L 9/002
380/258
2015/0317481 A1* 11/2015 Gardner ............... H04L 9/3221
726/2

(Continued)

OTHER PUBLICATIONS

Ben-Sasson, Eli, et al. Succinct Non-interatcive Zero-Knowledge for a von Neumann Architecture, Feb. 5, 2019.

*Primary Examiner* — Gary S Gracia
(74) *Attorney, Agent, or Firm* — Howson & Howson LLP

(57) ABSTRACT

A system for implementing a virtual machine based on a zero-knowledge proof circuit for general operation verification is disclosed, which includes a general operation verification circuit generator that generates a general operation verification circuit having a base number of commands, a base number of machine steps, and a base system size and generates proof keys and verification keys by using the general operation verification circuit and a zk-SNARK algorithm, a prover terminal that generates a proof by using a proof key included in the general operation verification circuit, coefficients of a polynomial function obtained through the zk-SNARK algorithm, and information required for verifying and proving from the general operation verification circuit; and a verifier terminal that performs verification of whether or not the proof is valid by using the verification key, the information required for verifying and proving from the general operation verification circuit, and the proof.

2 Claims, 5 Drawing Sheets

(56) References Cited

U.S. PATENT DOCUMENTS

| | | | |
|---|---|---|---|
| 2018/0331832 A1* | 11/2018 | Pulsifer | H04L 9/0637 |
| 2019/0364042 A1* | 11/2019 | Liu | H04L 63/0869 |
| 2020/0007331 A1* | 1/2020 | Wentz | H04L 9/321 |
| 2020/0302434 A1* | 9/2020 | Sethi | G06F 16/1824 |
| 2020/0349284 A1* | 11/2020 | Saket | H04L 63/00 |
| 2020/0396075 A1* | 12/2020 | Visegrady | H04L 9/3218 |

* cited by examiner

SYSTEM FOR IMPLEMENTING A VIRTUAL MACHINE BASED ON A ZERO-KNOWLEDGE PROOF CIRCUIT FOR GENERAL OPERATION VERIFICATION

CROSS-REFERENCE TO RELATED APPLICATION

This application claims the benefit of Korean Patent Application No. 10-2020-0082417, filed with the Korean Intellectual Property Office on Jul. 3, 2020, the disclosure of which is incorporated herein by reference in its entirety.

STATEMENT OF GOVERNMENT SUPPORT

This invention was made with the support of the Korean Ministry of Science Technology Information and Communication as a part of a research project of the Korean Institute of Information & Communications Technology Planning and Evaluation on "Blockchain Convergence Technology Development, the research being entitled "Development of Universal Zero-knowledge Proof Circuit-based Virtual Machines that validate general operations and reduce transaction validation and storage cost."

FIELD OF THE INVENTION

The invention relates to a system for implementing a virtual device based on a zero-knowledge proof circuit for general operation verification, more particularly to a system for implementing a zero-knowledge proof circuit-based virtual device for general operation verification that enables nodes performing the roles of proof and reporting, from among the entirety of the nodes, to quickly verify that the contents of a block have not been forged or altered even when the blockchain participants are not aware of the contents of the block.

BACKGROUND OF THE INVENTION

A blockchain refers to a distributed digital form of ledger that ensures the integrity of the transactions and allows participants to share the transaction history in a P2P (peer-to-peer) network without the involvement of a trusted third party.

A typical example that applies the blockchain is found in cryptocurrency such as Bitcoin, Ethereum, etc. For Ethereum, the introduction of the Ethereum Virtual Machine (hereinafter, EVM) has allowed users to perform programming directly as desired by the users rather than perform a predefined series of tasks.

However, the EVM provides a much lower efficiency compared to existing virtual machines such as the JVM (Java Virtual Machine) and has difficulties in supporting complicated application environments.

While numerous blockchain implementations have appeared in the past decade, there have been no particular innovations in the aspect of accumulating and storing transactions, and as this means that there is a need to verify every transaction, expandability is limited by this need.

That is, since each transaction type uses a separate verification algorithm, an increase in the size of a transaction entails an increase in the verification load, and as such, there is a need for a verification module that can be used commonly for various future blockchain platforms to lead a structural innovation for blockchain applications.

Blockchains can be divided into simple forms of blockchains made as UTXO's (unspent transaction outputs), a typical example of this type being Bitcoin, and complicated forms of blockchains that deal with state trees, where a typical example of this type being Ethereum.

Currently, zero-knowledge proof is being utilized only in processing certain transactions in simple forms of blockchains. Here, zero-knowledge proof refers to a system in which the prover proves to a verifier that certain knowledge is known without revealing the knowledge and information known to the prover.

SUMMARY OF THE INVENTION

An objective of the invention is to provide a system for implementing a zero-knowledge proof circuit-based virtual machine for general operation verification.

Another objective of the invention is to provide a system for implementing a zero-knowledge proof circuit-based virtual machine for general operation verification that enables a user to utilize zero-knowledge proof in various desired forms of transactions rather than in certain pre-defined forms of transactions only.

Still another objective of the invention is to provide a system for implementing a zero-knowledge proof circuit-based virtual machine for general operation verification that enables nodes performing the roles of proof and reporting, from among the entirety of the nodes, to quickly verify that the contents of a block have not been forged or altered even when the blockchain participants are not aware of the contents of the block.

Yet another objective of the invention is to provide a system for implementing a zero-knowledge proof circuit-based virtual machine for general operation verification that can drastically increase the block sync speed for participants to allow new participants to quickly participate in the network.

Another objective of the invention is to provide a system for implementing a zero-knowledge proof circuit-based virtual machine for general operation verification that can compress data and reduce data storage space by pruning actual data and leaving only proof of the data when the zero-knowledge proof technology is applied to transaction data storage.

The objectives of the invention are not limited to the objectives mentioned above, and other objectives and advantages of the invention can be understood from the descriptions below and can be more clearly understood from the embodiments of the invention. It should be easily appreciated that the objectives and advantages of the invention can be achieved from the elements disclosed in the claims and combinations thereof.

A system for implementing a virtual machine based on a zero-knowledge proof circuit for general operation verification conceived to achieve the objectives above may include: a general operation verification circuit generator configured to generate a general operation verification circuit having a base number of commands, a base number of machine steps, and a base system size and to generate proof keys and verification keys by using the general operation verification circuit and a zk-SNARK (zero-knowledge succinct non-interactive argument of knowledge) algorithm, a prover terminal configured to generate a proof by using a proof key included in the general operation verification circuit, coefficients of a polynomial function obtained through the zk-SNARK algorithm, and information required for verifying and proving from the general operation verification circuit; and a verifier terminal configured to perform verification of whether or not the proof is valid by using the verification key, the information required for verifying and proving from the general operation verification circuit, and the proof.

The general operation verification circuit generator may include a circuit generation module that generates a general operation verification circuit capable of operating under any program having the base number of commands, the base number of machine steps, and the base system size; and a zk-SNARK key generation module that generates the proof keys and the verification keys by using a security parameter and the circuit generated by the circuit generation module after receiving key generator information, prover information, and verifier information.

The zk-SNARK key generation module may generate the polynomial function by converting a verification rule into a mathematical form indicating a triple vector and afterwards subjecting the verification rule that has been converted into the triple vector to a Lagrange polynomial or fast Fourier transformation, and the circuit generation module may generate the general operation verification circuit by using Equation 1.

$$C = O((l+n+T) \cdot \log(l+n+T)) \text{gates.} \quad \text{[Equation 1]}$$

C: circuit,
l: base number of commands,
T: base number of machine steps,
n: base system size.

Also, a method for generating a zero-knowledge proof circuit for general operation verification conceived to achieve the objectives above may include: generating by a general operation verification circuit generator of a general operation verification circuit having a base number of commands, a base number of machine steps, and a base system size; generating by the general operation verification circuit generator of proof keys and verification keys using the general operation verification circuit and a zk-SNARK (zero-knowledge succinct non-interactive argument of knowledge) algorithm; generating by a prover terminal of a proof using a proof key included in the general operation verification circuit, coefficients of a polynomial function obtained through the zk-SNARK algorithm, and information required for verifying and proving from the general operation verification circuit; and verifying by a verifier terminal of whether or not the proof is valid using the verification key, the information required for verifying and proving from the general operation verification circuit, and the proof.

The step of generating the proof keys and verification keys may involve the general operation verification circuit generator receiving the key generator information, prover information, and verifier information and afterwards generating the proof keys and verification keys by using a security parameter and the general operation verification circuit generated by the circuit generation module, where the circuit generation module may generate the general operation verification circuit by using Equation 1 below.

$$C = O((l+n+T) \cdot \log(l+n+T)) \text{gates.} \quad \text{[Equation 1]}$$

C: circuit,
l: base number of commands,
T: base number of machine steps,
n: base system size.

The step of generating the proof keys and verification keys may include: converting a verification rule into a mathematical form indicating a triple vector, and subjecting the verification rule that has been converted into a triple vector to a Lagrange polynomial or fast Fourier transformation.

An embodiment of the invention as described above provides the advantage of allowing general operation verification.

Also, an embodiment of the invention provides the advantage of enabling the user to utilize zero-knowledge proof in various desired forms of transactions rather than in certain pre-defined forms of transactions only.

Also, an embodiment of the invention provides the advantage of enabling nodes performing the roles of proof and reporting, from among the entirety of the nodes, to quickly verify that the contents of a block have not been forged or altered even when the blockchain participants are not aware of the contents of the block.

Also, an embodiment of the invention provides the advantage of drastically increasing the block sync speed for participants to thereby allow new participants to quickly participate in the network.

Also, an embodiment of the invention provides the advantage of compressing data and reducing data storage space by pruning actual data and leaving only proof of the data when the zero-knowledge proof technology is applied to transaction data storage.

DETAILED DESCRIPTION OF THE INVENTION

Figure 1:
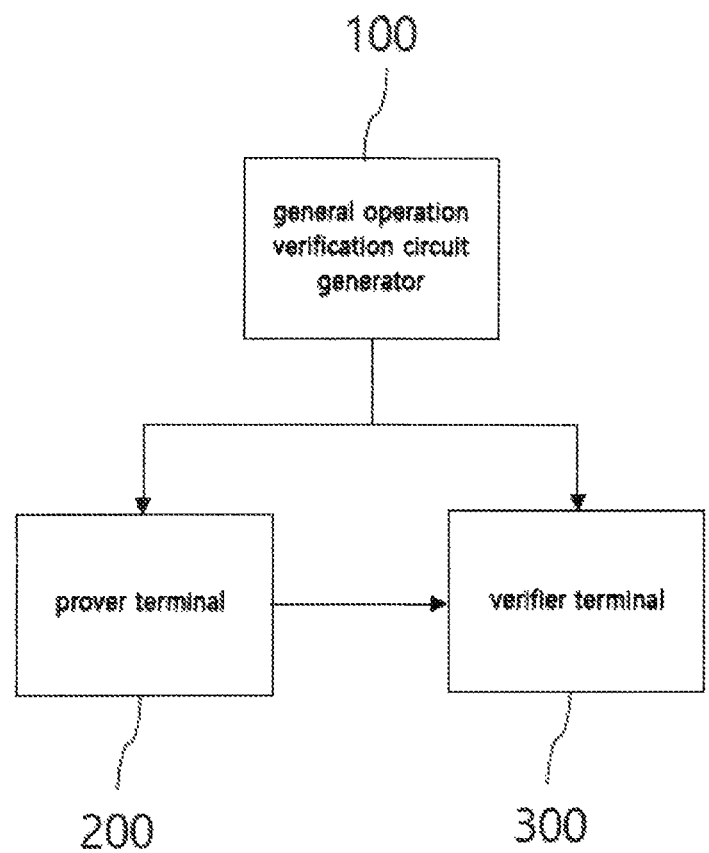
FIG. 1 is a block diagram illustrating the internal structure of a system for implementing a zero-knowledge proof circuit-based virtual machine for general operation verification according to an embodiment of the invention.

The objectives, features, and advantages set forth above will be described below in further detail with reference to the accompanying drawings, enabling the person having ordinary skill in the field of art to which the present invention pertains to readily practice the technical spirit of the invention. In describing the invention, specifics relating to publicly known technology relevant to the invention are not described in detail if it is deemed that such descriptions may unnecessarily obscure the essence of the invention. A preferred embodiment of the invention is described below with reference to the accompanying drawings. In the drawings, the same reference numerals are used to represent the same or similar elements.

In the present specification, the term "zero-knowledge proof", or "ZKP" for short, refers to an interactive procedure in cryptography by which a prover proves to a counterpart verifier that a certain statement is true, where no knowledge other than the truth or falseness of the statement is revealed.

A party that wishes to prove that a certain statement is true is referred to as a prover, and a party that participates in a proving process to exchange information with the prover is referred to as a verifier. If the parties participating in zero-knowledge proof arbitrarily change a protocol with the intent of deceiving their counterparts, the parties are referred to as being dishonest or not honest. Otherwise, the parties are referred to as being honest.

Figure 2:
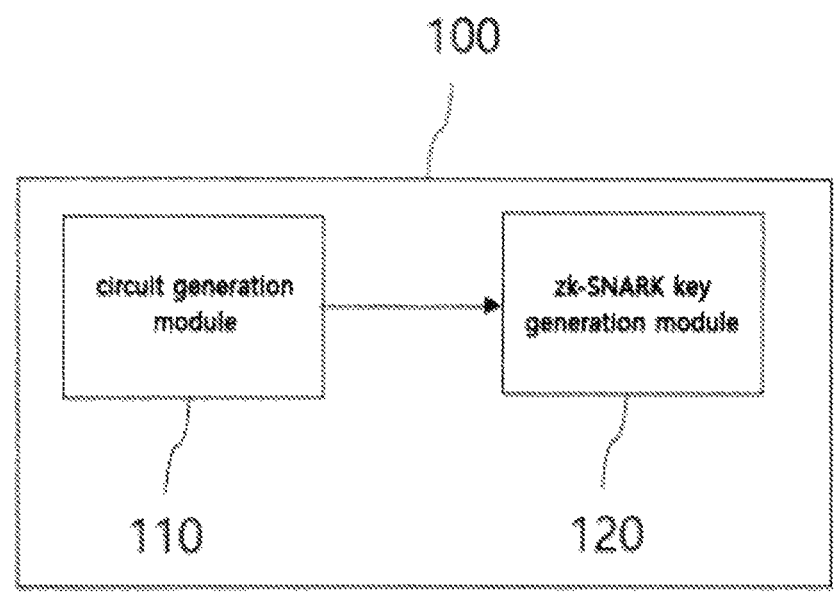
FIG. 2 is a block diagram illustrating the internal structure of a circuit generator for general operation verification according to an embodiment of the invention.

FIG. 1 is a block diagram illustrating the internal structure of a system for implementing a zero-knowledge proof circuit-based virtual machine for general operation verification according to an embodiment of the invention. FIG. 2 is a block diagram illustrating the internal structure of a circuit generator for general operation verification according to an embodiment of the invention.

Referring to FIG. 1, a system for implementing a zero-knowledge proof circuit-based virtual machine for general operation verification may include a general operation verification circuit generator 100, a prover terminal 200, and a verifier terminal 300.

The general operation verification circuit generator 100 may be a device for generating a general operation verification circuit. Such a general operation verification circuit generator 100 may include a circuit generation module 110 and a zk-SNARK key generation module 120 as illustrated in FIG. 2.

The circuit generation module 110 may receive a base number of commands, a base number of machine steps, and a base system size, may generate a general operation verification circuit that operates under any program having the base number of commands, base number of machine steps, and base system size, and afterwards may provide the general operation verification circuit to the zk-SNARK key generation module 120.

In one embodiment, the circuit generation module 110 may generate a general operation verification circuit that satisfies Equation 1 below. That is, the general operation verification circuit generator 100 can generate a circuit that operates with any program having an/number of or fewer commands, a T number of or fewer machine steps, and a size of n or smaller.

$$C = O((l+n+T) \cdot \log(l+n+T)) \text{gates.} \quad \text{[Equation 1]}$$

C: circuit,
l: base number of commands.
T: base number of machine steps,
n: base system size.

A circuit C that operates under any program having an l number of or fewer commands, a T number of or fewer machine steps, and a size of n or smaller based on Equation 1 above does not depend on the program or major input values and relies only on the values of l, T, and n, making it universal. When it is coupled with the zk-SNARK key generation module 120, the parameters of the verification system may also be made universal.

In this case, it is possible to verify all programs with a one-time key generation and afterwards select a key appropriate for a given calculation range, so that the cost of generating a key for each program can be reduced.

The zk-SNARK key generation module 120 may receive key generator information, prover information, and verifier information, and then use a security parameter λ and the circuit (C: $F^n \times F^h \rightarrow F^l$) generated by the circuit generation module 110 to generate proof keys pk and verification keys vk.

First, the zk-SNARK key generation module 120 may use a zk-SNARK (zero-knowledge succinct non-interactive argument of knowledge) algorithm to generate proof of ownership of certain information such as a secret key without revealing the information itself.

That is, the zk-SNARK key generation module 120 may convert a verification rule into a mathematical form indicating a triple vector and then generate a polynomial function by subjecting the verification rule which was converted into a triple vector to a Lagrange polynomial or fast Fourier transformation.

More specifically, the zk-SNARK key generation module 120 may convert the verification rule into a R1CS (rank-1 constraint system) format and then convert the R1CS into a QAP (quadratic arithmetic program). Here, the verification rule may be related to whether or not an inputted amount is greater than an outputted amount, whether or not a transaction has an appropriate signature, whether or not an input corresponds to an UTXO, and the like.

Next, the zk-SNARK key generation module 120 can compute the values of $A_i$, $B_i$, $C_i$ through a random element I.

Here. $(\vec{A}, \vec{B}, \vec{C}, Z) := \text{QAPinst}(C)$ is a QAP instance and is used for generating the proof keys pk and the verification keys vk. That is, an embodiment of the invention uses the structural properties of a QAP derived from an arithmetic circuit in order to reduce the size of the proofkey pk.

Also, the R1CS involves a triple vector (A, B, C). Such a triple vector represents a mathematical form of the verification rule, and the QAP may undergo a Lagrange polynomial or fast Fourier transformation to be expressed as Equation 2.

Here, the zk-SNARK key generation module 120 may generate proof keys pk and verification keys vk once only per circuit.

Therefore, once generated, any prover terminal 200 can generate proof π by using a proof key pk, and any verifier terminal 300 can generate proof π by using a verification key vk.

An embodiment of the invention can further achieve efficiency in terms of space rather than time. More specifically, the structural properties of the QAP derived from an arithmetic circuit may be used to reduce the size of the proof key pk.

Thus, all programs can be verified with a one-time circuit generation, and afterwards a key appropriate for a given calculation range can be selected. In this way, the cost of generating a key for each program can be reduced.

The prover terminal 200 may be the terminal that generates the proof a by using a proof key pk generated at the general operation verification circuit generator 100. Such a prover terminal 200 may generate the proof a by using the proof key pk generated at the general operation verification circuit generator 100, the coefficients of the polynomial function obtained through the zk-SNARK algorithm, and information $\vec{x}$ required for the verifying and proving.

In one embodiment, the prover terminal 200 can generate the proof π by referencing Equation 2 below.

$$H(z) := \frac{A(z)B(z) - C(z)}{Z(z)} \quad \text{[Equation 2]}$$

A, B, C ∈ $F_r[z]$: derived from the QAP instance $(\vec{A}, \vec{B}, \vec{C}, Z) := \text{QAPinst}(C)$ and the proof of the QAP.

That is, the prover terminal 200 can generate the proof π by using the coefficient $\vec{h}$ computed from Equation 2, the proof $\vec{s}$ of the QAP, and the proof key pk.

The verifier terminal 300 may serve to verify that the proof π is valid, upon receiving the verification keys vk, the information $\vec{x}$ required for the verifying and proving, and the proof π.

First, the verifier terminal 300 may compute Equation 3 by using a portion of the verification keys vk and the information $\vec{x}$ required for the verifying and proving and then may use the verification keys vk and the resultant value of Equation 3 to calculate the twelve pairings and perform the required inspection.

$$vk_{\vec{x}} := vk_{IC,0} + \sum_{i=1}^{n} x_i vk_{IC,i} \qquad \text{[Equation 3]}$$

vk: verification key,
n: input size,
C: circuit.

During the computation of Equation 3, a variable-based multi-scalar product technique can be used to reduce the amount of computation needed in calculating $vk_{\vec{x}}$. i.e. the result of Equation 3, and while a constant time is spent for the pairing evaluation regardless of the input size n, such evaluation is very costly and is dominant with respect to small circuits.

A system for implementing a zero-knowledge proof circuit-based virtual machine for general operation verification may ascertain that a transaction is proper when verification is performed for a proof. Here, since zero-knowledge proof technology capable of general operation verification is applied to the opcode execution module of the virtual machine, it is capable of knowing whether or not a transaction is a proper transaction by performing verification on the zero-knowledge proof even if it did not perform the transaction.

For this, a system for implementing a virtual machine based on a zero-knowledge proof circuit for general operation verification may include a code generation unit, a compiler, a storage unit, a stack, and a code execution unit.

The code generation unit may generate code written in the Solidity language to represent the zero-knowledge proof stored in the storage unit. Here, since Solidity is a language made to be understood by humans, in order to be operated on a virtual machine, it is necessary to convert the code into machine language understood by the virtual machine. Thus, the code generated by the code generation unit may be compiled by the compiler and converted into Ethereum Bytecode for operation on the virtual machine.

The compiler may compile the code generated by the code generation unit to generate the Ethereum Bytecode and may provide the Ethereum Bytecode to the code execution unit.

The storage unit may store the zero-knowledge proof generated by the prover terminal. A system for implementing a zero-knowledge proof circuit-based for general operation verification can ascertain that a transaction is a proper transaction by performing verification on the zero-knowledge proof stored in the storage unit. That is, as a virtual machine according to an embodiment of the invention employs zero-knowledge proof technology, it is capable of checking whether or not a transaction is proper through a verification of the zero-knowledge proof, even if it did not perform the transaction.

The stack may store the opcodes separated from the Ethereum Bytecode during the execution of the Ethereum Bytecode.

The code execution unit may execute the Ethereum Bytecode generated by the compiler to perform verification for the zero-knowledge proof. Here, the code execution unit may separate the Ethereum Bytecode into opcodes and store these in the stack, and the opcodes stored in the stack may be executed sequentially.

As an embodiment of the invention applies the zero-knowledge proof technology to the code execution unit, it is capable of ascertaining that a transaction is a proper transaction by performing verification on the zero-knowledge proof even if it did not perform the transaction.

When the zero-knowledge proof technology that enables general operation verification is applied to the opcode execution module of a system for implementing a zero-knowledge proof circuit-based virtual machine for general operation verification as described above, TX data from among the data stored in the storage module may be replaced by zero-knowledge proofs. Thus, as an embodiment of the invention applies the zero-knowledge proof technology to the opcode execution module of the system for implementing a zero-knowledge proof circuit-based virtual machine for general operation verification, it is capable of ascertaining that a transaction is a proper transaction by performing verification on the zero-knowledge proof without having to perform the transaction.

Figure 3:
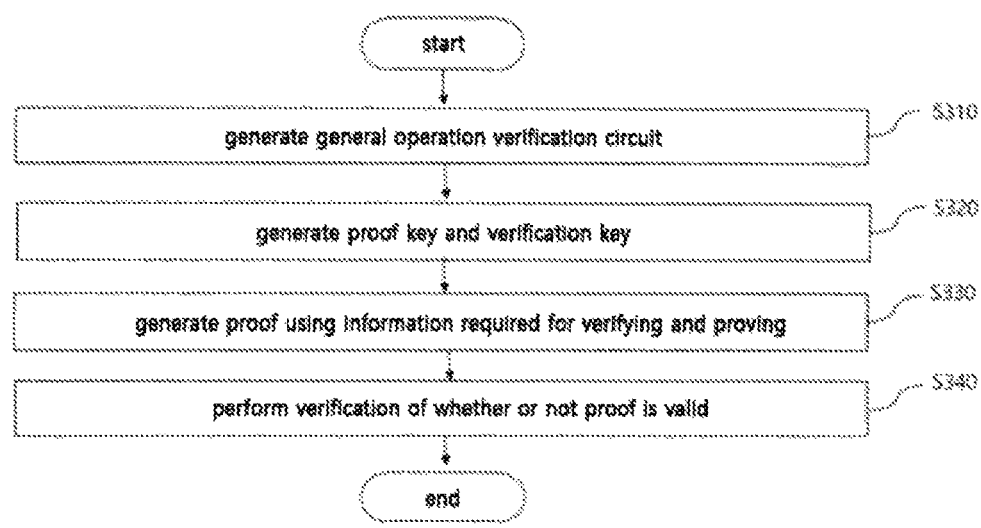
FIG. 3 is a flow diagram illustrating a method of generating a zero-knowledge proof circuit for general operation verification according to an embodiment of the invention.

FIG. 3 is a flow diagram illustrating a method of generating a zero-knowledge proof circuit for general operation verification according to an embodiment of the invention.

Referring to FIG. 3, a general operation verification circuit generator 100 may generate a general operation verification circuit having a base number of commands, a base number of machine steps, and a base system size (step S310).

In one embodiment for step S310, the general operation verification circuit generator 100 can receive a base number of commands, a base number of machine steps, and a base system size and can generate a general operation verification circuit that operates under any program having the base number of commands, base number of machine steps, and base system size.

Here, the general operation verification circuit generator 100 can generate a circuit that operates with any program having an l number of or fewer commands, a T number of or fewer machine steps, and a size of n or smaller, as in Equation 1.

A circuit C that operates under any program having an l number of or fewer commands, a T number of or fewer machine steps, and a size of n or smaller based on Equation 1 above does not depend on the program or major input values and relies only on the values of l, T and n, making it universal. When it is coupled with the zk-SNARK key generation module 120, the parameters of the verification system may also be made universal.

In this case, it is possible to verify all programs with a one-time key generation and afterwards select a key appropriate for a given calculation range, so that the cost of generating a key for each program can be reduced.

The general operation verification circuit generator 100 may use the general operation verification circuit and a zk-SNARK (zero-knowledge succinct non-interactive argument of knowledge) algorithm to generate proof keys and verification keys (step S320).

In one embodiment for step S320, the general operation verification circuit generator 100 may receive key generator information, prover information, and verifier information, and then generate proof keys and verification keys by using a security parameter and the general operation verification circuit generated by the circuit generation module.

Here, the general operation verification circuit generator 100 may convert a verification rule into a mathematical form indicating a triple vector and then generate a polynomial function by subjecting the verification rule which was converted into a triple vector to a Lagrange polynomial or fast Fourier transformation.

The prover terminal may generate the proof by using a proof key included in the general operation verification circuit, the coefficients of the polynomial function obtained through the zk-SNARK algorithm, and information required for the verifying and proving from among the general operation verification circuit (step S330).

The verifier terminal may perform verification as regards whether or not the proof is valid by using the information required for the verifying and proving obtained from the general operation verification circuit as well as the proof (step S340).

Figure 4:
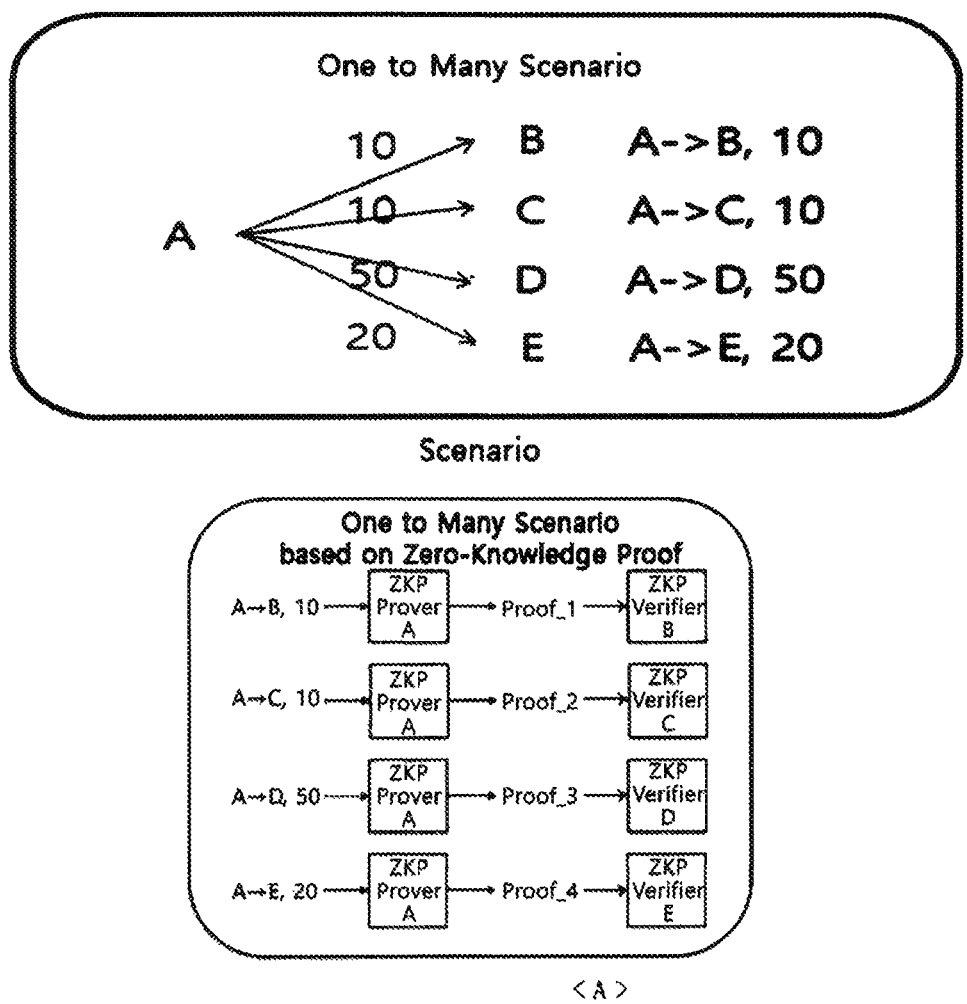
FIGS. 4 and 5 are example diagrams illustrating a process for generating a zero-knowledge proof circuit for general operation verification according to an embodiment of the invention.

FIG. 4, 5 is an example diagram illustrating a process for generating a zero-knowledge proof circuit for general operation verification according to an embodiment of the invention.

Referring to FIG. 4, 5, proving the legitimacy of a single given proof is to prove the legitimacy of many proofs related to the single proof. For example, a scenario is considered in which a verifier checks whether or not a prover has correctly resolved five problems presented to the prover.

With the conventional zero-knowledge proof, a prover A must provide four proofs as shown in FIG. 4. Then, verifiers B, C, D. and E may use the received proofs respectively to each perform verification.

Figure 5:
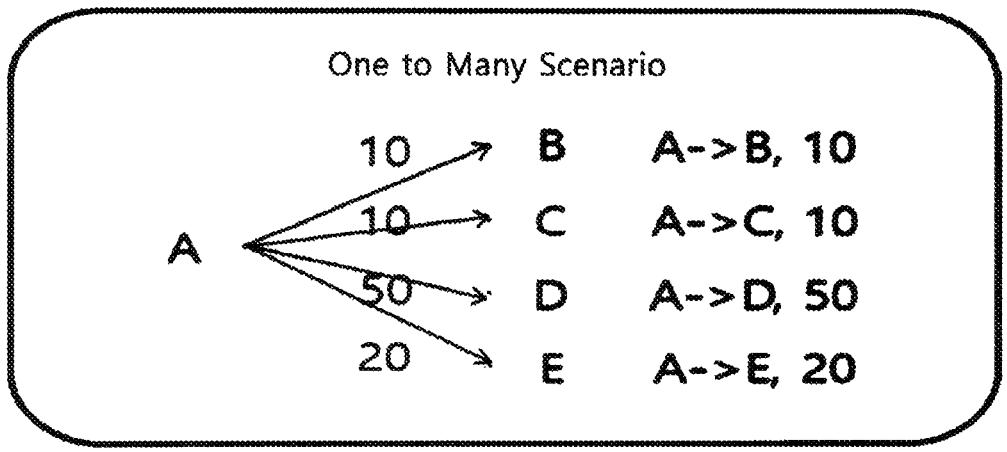
Figure 5:
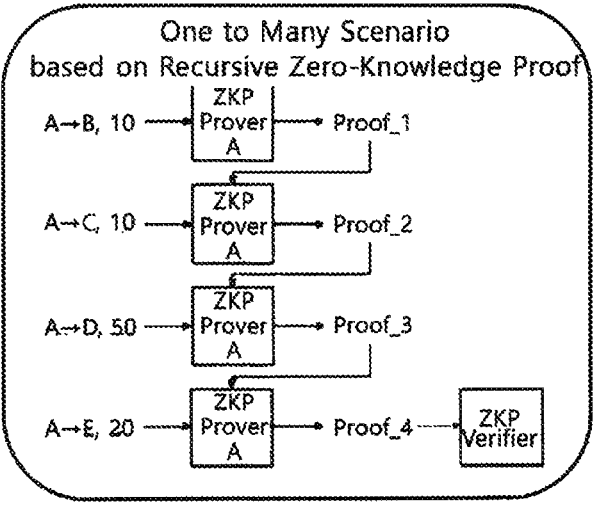

However, by using recursive zero-knowledge proof according to an embodiment of the invention as shown in FIG. 5, the prover A may provide only the final Proof_4, which was computed last, and the verifiers B, C, D, and E may use this to perform the verification.

Providing a detailed description with reference to FIG. 5, when the verifier terminal 300 presents multiple questions to the prover terminal 200, the prover terminal 200 may generate Proof 1 corresponding to Question 1 from among the multiple questions, generate Proof 2 by using Question 2 from among the multiple questions and Proof 1, generate Proof 3 by using Question 3 and Proof 2, and generate the final Proof 4 for Question 4 among the multiple questions by using Question 4 and Proof 3.

The prover terminal 200 may generate the final Proof 4 corresponding to the final Question 4 by using Proof 1 corresponding to Question 1 and may provide only the final Proof 4 to the verifier terminal 300 with Proofs 1, 2, and 3 excluded rather than presenting the proof for each of the multiple questions.

The verifier terminal 300 may verify only the final Proof 4 to prove the legitimacy of the final Proof 4 and the remaining Proofs 1, 2, and 3 associated with the final Proof 4.

Although the descriptions above refer to limited embodiments and drawings, the present invention is not limited to the embodiments above, and the person having ordinary skill in the field of art to which the present invention pertains would be able to derive various modifications and alterations from the disclosure above without departing from the spirit and scope of the present invention. Therefore, the present inventive concept must be defined only by the claims appended below, and all equivalents or substitutive alterations are to be regarded as being encompassed within the scope of the present inventive concept.

The present invention is not limited to the particular preferred embodiments described above, and it is to be appreciated that various alterations can be made by any one of ordinary skill in the field of art to which the present invention pertains without departing from the essence of the present invention as claimed below and that such changes lie within the scope of the present invention as long as they relate to the technical spirit of the present invention.

What is claimed is:

1. A system for implementing a virtual machine based on a zero-knowledge proof circuit for general operation verification, the system comprising: a general operation verification circuit generator configured to generate a general operation verification circuit having a base number of commands, a base number of machine steps, and a base system size and to generate proof keys and verification keys by using the general operation verification circuit and a zk-SNARK (zero-knowledge succinct non-interactive argument of knowledge) algorithm; a prover terminal configured to generate a proof by using a proof key included in the general operation verification circuit, coefficients of a polynomial function obtained through the zk-SNARK algorithm, and information required for verifying and proving from the general operation verification circuit; and a verifier terminal configured to perform verification of whether or not the proof is valid by using a verification key included in the general operation verification circuit, the information required for verifying and proving from the general operation verification circuit, and the proof, wherein:

the general operation verification circuit generator comprises a circuit generation module configured to generate a general operation verification circuit capable of operating under any program having the base number of commands, the base number of machine steps, and the base system size by using Equation 1 below; and a zk-SNARK key generation module configured to generate the proof keys and the verification keys by using a security parameter and the circuit generated by the circuit generation module after receiving key generator information, prover information, and verifier information;

the zk-SNARK key generation module generates the polynomial function by converting a verification rule into a mathematical form indicating a triple vector and afterwards subjecting the verification rule that has been converted into the triple vector to a Lagrange polynomial or fast Fourier transformation, the prover terminal generates the proof by using the proof key generated at the general operation verification circuit generator, the coefficients of the polynomial function obtained through the zk-SNARK algorithm, and the information required for verifying and proving according to Equation 2 below, the verifier terminal computes Equation 3 below by using a portion of the verification keys and the information required for verifying and proving and uses the verification keys and a resultant value of Equation 3 to calculate twelve pairings and perform a required inspection, wherein a variable-based multi-scalar product technique is used during a computation of Equation 3 to reduce an amount of computation;

the system for implementing a virtual machine based on a zero-knowledge proof circuit for general operation verification further comprises a storage unit, a code generation unit, a compiler, a storage unit, a stack, and a code execution unit in order to allow an ascertaining of whether or not a transaction is proper by performing verification on a proof without having to execute the transaction, the storage unit stores the proof generated by the prover terminal;

the code generation unit generates code written in a Solidity language to represent the proof stored in the storage unit, the code generated by the code generation unit compiled by the compiler and converted into Ethereum Bytecode;

the compiler compiles the code generated by the code generation unit to generate the Ethereum Bytecode and provides the Ethereum Bytecode to the code execution unit;

the code execution unit executes the Ethereum Bytecode generated by the compiler to perform verification for the proof and separates the Ethereum Bytecode into opcodes and stores the opcodes in the stack;

the stack stores the opcodes separated from the Ethereum Bytecode during an execution of the Ethereum Bytecode;

when the verifier terminal presents a plurality of questions to the prover terminal, the prover terminal uses recursive zero-knowledge proof to generate Proof 1 corresponding to Question 1 among the plurality of questions, generate Proof 2 by using Question 2 among the plurality of questions and said Proof 1, generate Proof 3 by using Question 3 among the plurality of questions and said Proof 2, generate a final Proof 4 for a final Question 4 among the plurality of questions by using said Question 4 and said Proof 3;

the prover terminal presents only the final Proof 4 to the verifier terminal with Proofs 1, 2, and 3 excluded instead of presenting a proof for each of the plurality of questions by using said Proof 1 corresponding to said Question 1 to generate the final Proof 4 corresponding to the final Question 4; and the verifier terminal verifies only the final Proof 4 to prove a legitimacy of the final Proof 4 and the remaining Proofs 1, 2, and 3 associated with the final Proof 4, where said Equation 1, said Equation 2, and said Equation 3 are as below:

$$C = O((l+n+T) \cdot \log(l+n+T)) \text{gates}, \quad \text{[Equation 1]}$$

(C: circuit, l: base number of commands, T: base number of machine steps, n: base system size)

$$H(z) := \frac{A(z)B(z) - C(z)}{Z(z)} \quad \text{[Equation 2]}$$

(A, B, C $\in F_r[z]$: derived from a QAP instance ($\vec{A}$, $\vec{B}$, $\vec{C}$,Z):=QAPinst(C) and a proof of the QAP)

$$vk_{\vec{x}} := vk_{IC,0} + \sum_{i=1}^{n} x_i vk_{IC,i} \quad \text{[Equation 3]}$$

vk verification key,
n: input size,
C: circuit.

2. The system for implementing a virtual machine based on a zero-knowledge proof circuit for general operation verification according to claim 1, wherein the zk-SNARK key generation module converts the verification rule into a RICS (rank-1 constraint system) format and then converts the RICS to a QAP (quadratic arithmetic program).

* * * * *